United States Patent
Fergason

[11] 3,731,986
[45] May 8, 1973

[54] DISPLAY DEVICES UTILIZING LIQUID CRYSTAL LIGHT MODULATION

[75] Inventor: James L. Fergason, Kent, Ohio

[73] Assignee: International Liquid Xtal Company, Cleveland, Ohio

[22] Filed: Apr. 22, 1971

[21] Appl. No.: 136,441

Related U.S. Application Data

[63] Continuation-in-part of Ser. No. 113,948, Feb. 9, 1971, abandoned.

[52] U.S. Cl................350/150, 252/408, 340/324 R, 350/160 LC
[51] Int. Cl.................................G02f 1/18
[58] Field of Search...............350/150, 157, 160; 252/408; 340/324 R

[56] References Cited

UNITED STATES PATENTS

| | | | |
|---|---|---|---|
| 3,597,044 | 8/1971 | Castellano | 350/160 |
| 3,499,702 | 3/1970 | Goldmacher et al. | 350/150 |
| 3,581,002 | 5/1971 | Dodds | 350/160 |
| 3,597,043 | 8/1971 | Dreyer | 350/150 |
| 3,625,591 | 12/1971 | Freiser | 350/150 |
| 3,576,364 | 4/1971 | Zanoni | 350/160 |
| 3,612,654 | 10/1971 | Klein | 350/160 |

*Primary Examiner*—Edward S. Bauer
*Attorney*—Brown, Murray, Flick & Peckham

[57] ABSTRACT

Optical display devices for converting electrical intelligence into optical images with the use of a shutter device comprising a layer of liquid crystal material sandwiched between opposing parallel plates coated with transparent conducting films. These plates, with the liquid crystal material therebetween, are disposed between and parallel to a pair of polarizers such that when an electrical potential is established across the conducting films and the liquid crystal layer, the device will change from a light transmitting to opaque medium, or vice versa, depending upon the orientation of the two polarizers. By forming the two conducting films in the shape of a desired optical image, that image can be made to appear or disappear, depending upon whether a potential is established between the conducting films. Furthermore, by creating separate conducting areas, as by etching the conducting films, any given number of conductive regions can be switched ON while other regions are not affected to produce any one of a number of different images with the same liquid crystal sandwich assembly. Finally, by etching a pattern of strips of transparent conducting material on the two opposing plates, by orienting the strips on the respective plates at right angles to each other, and by selectively applying pulsed voltages to the strips on the respective plates, the area of liquid crystal layer can be scanned point by point to produce with the same display any one of a number of optical images such as numerals, letters or the like. The invention has particular utility in computer and calculator read-outs, for example, since the display can be energized at a voltage level compatible with that used to drive the integrated circuitry used in such devices without the necessity for relatively high voltage driving circuitry.

11 Claims, 8 Drawing Figures

PATENTED MAY 8 1973 3,731,986
SHEET 1 OF 2
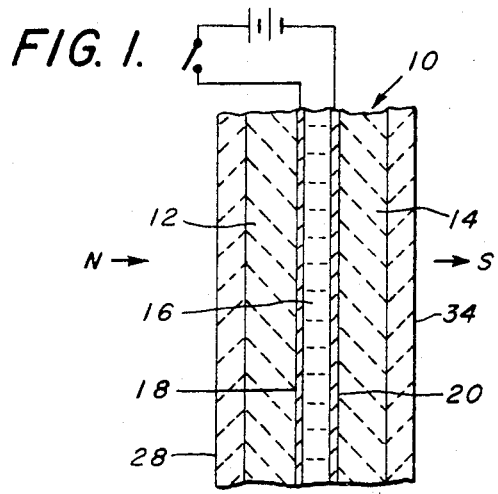
FIG. 1.
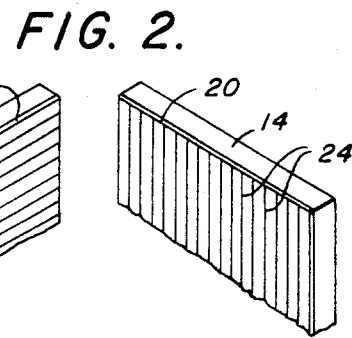
FIG. 2.
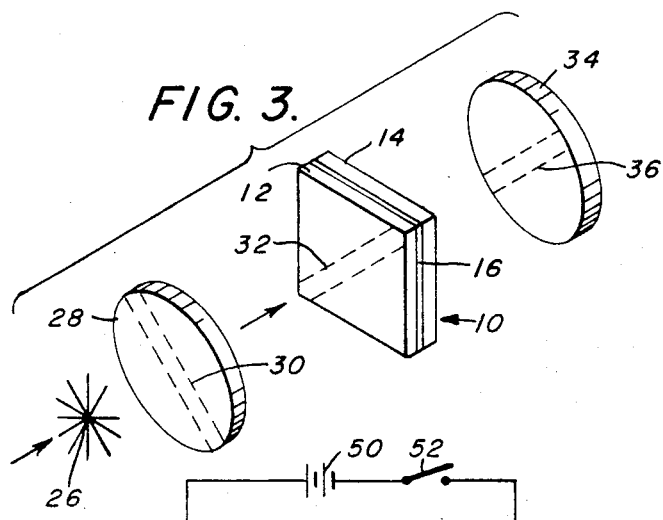
FIG. 3.
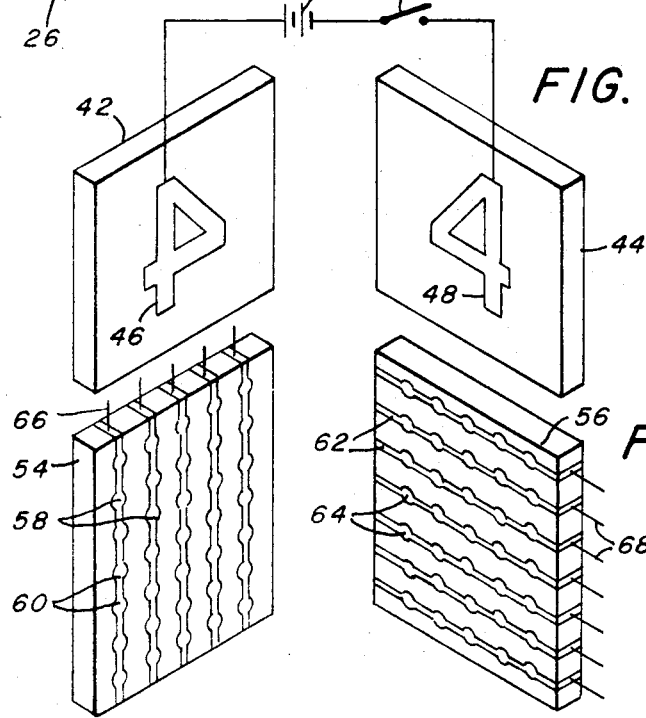
FIG. 4.
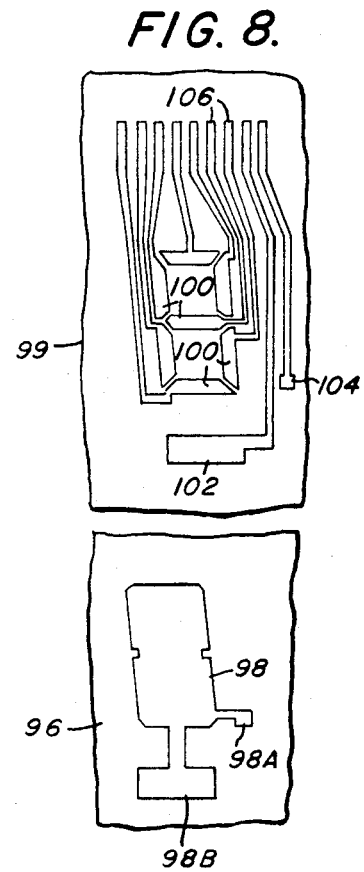
FIG. 8.
FIG. 5.
INVENTOR.
JAMES L. FERGASON
By
Brown, Murray, Flick & Peckham
Attorneys

DISPLAY DEVICES UTILIZING LIQUID CRYSTAL LIGHT MODULATION

CROSS-REFERENCES TO RELATED APPLICATIONS

This application is a continuation-in-part of copending application Ser. No. 113,948, filed Feb. 9, 1971 and now abandoned in the name of James L. Fergason as inventor and entitled "Liquid-Crystal Non-Linear Light Modulators Using Electric and Magnetic Fields."

BACKGROUND OF THE INVENTION

As is known, there are a large number of organic chemical compounds that will, within a particular temperature range, exhibit nematic-phase liquid crystals. These compounds are liquid in the sense that their molecules are not dissociated as in a gas nor so tightly bound within a structure as to constitute a solid. At the same time, they are said to be crystalline, in that there is a particular ordering to the orientation of the molecules, as is sometimes evidenced by peculiar optical effects.

It is also known that when a nematic-phase liquid crystal material is sandwiched between transparent plates that have been rubbed, each of them unidirectionally and on the surface in contact with the nematic-phase liquid crystal material, there is obtained a liquid-crystal unit whose optic axis lies in the direction of unidirectional rubbing. If two rubbed plates with the rubbed directions at right angles to each other are used to contain a nematic liquid, then the resulting effect will be an optical media which rotates the plane of polarization by 90°. Similarly, if the two rubbed directions are aligned 45° with respect to each other, the resulting nematic liquid will rotate the plane of polarized light by 45°. Any amount of rotation between 0° and 90° can be obtained by using such rubbed surfaces.

By using nematic materials which align parallel with an applied electric or magnetic field, the nematic alignment is disrupted at a low field level. The mechanism involved resides in the fact that the liquid crystal is elastically deformed by surface constraints such that the long axis of the nematic material is oriented in a helical manner. If the direction of the molecules at the center of the sample is changed such that they are parallel with an applied field which is also parallel with the twist direction, no torque is exerted on opposite sides of the liquid crystal and it no longer remains twisted. This will occur just as the molecules at the center of the nematic cell become parallel to the applied electric field. Therefore, it will occur at a very sharp field level resulting in bistable operation. The voltage required is determined by the relationship:

$$V = \pi(k/\Delta t)^{1/2}$$

where $k$ is an elastic constant and $\Delta t$ is the difference in electrical polarizability parallel and perpendicular to the long axis. When such a device with a 90° twist is placed between parallel polarizers, no light will be transmitted at zero voltage and it will be the equivalent of two crossed polarizers. When an electric field is applied to the device, the structure will untwist at a well defined voltage and allow light transmission. If, however, the same device is placed between crossed polarizers, then at zero voltage light is transmitted and the polarizers will effectively act as though they are parallel. However, with the application of a critical voltage, the plane of polarization will no longer be rotated 90° and no light will be transmitted. Thus, the device acts as a shutter for transmitted light. The liquid crystal material used must be nematic and must have a positive dielectric anisotropy. At the same time, the material must be nematic over a substantial temperature range, including the room temperature range. A suitable material for this purpose is described in copending application Ser. No. 113,948, filed Feb. 9, 1971, of which this application is a continuation-in-part. It comprises a mixture of 40 percent bis-(4'-n-octyloxybenzal)-2-chlorophenylenediamine, 50 percent p-methylbenzal-p'-n-butylaniline and 10 percent p-cyanobenzal-p'-n-butylaniline.

SUMMARY OF THE INVENTION

In accordance with the present invention, liquid crystal material sandwiched between rubbed transparent plates and disposed between polarizers is utilized to construct devices which display information spatially. Specifically, there is provided a device for converting electrical intelligence into an optical image comprising a layer of liquid crystal material disposed between transparent parallel plates which are coated on only selected areas thereof with films of transparent conducting material, polarizers on opposite sides of the plates and essentially parallel thereto to provide a sandwich structure through which light can pass, and means for establishing a potential difference between conducting transparent films on the respective plates such that areas of the sandwich structure will transmit light while others will not to form an optical image.

In one embodiment of the invention, an optical image is formed by etching conductive glass in a pattern which represents a number or symbol. In another embodiment, separate conducting areas are created such that any number of conductive regions can be switched ON while other regions are not affected to produce any one of a number of different images.

In accordance with still other embodiments of the invention, a pattern of strips of transparent conducting material is etched on the two transparent plates on opposite sides of a film of nematic liquid crystal material. The strips are then rubbed in such a manner that the rubbed direction is parallel to the strips. The two transparent plates are placed together with the strips perpendicular. By applying pulsed voltages to a pair of crossed strips on the respective glass plates, only that region where the strips cross will be transparent, for example, while the remainder of the liquid crystal is opaque. Thus, it is possible to scan a region point by point. If the strips on one plate are called rows while those on the other columns, each row can be scanned by applying a field pattern to the columns. With proper adjustment of voltages, it is then possible to scan such a system. The output of such a system is binary, being either ON or OFF.

The above and other objects and features of the invention will become apparent from the following detailed description taken in connection with the accompanying drawings which form a part of this specification, and in which:

FIG. 1 is a schematic view of a liquid crystal unit made in accordance with the present invention;

FIG. 2 is a view illustrating the manner in which the transparent plates of the liquid crystal unit of FIG. 1 are rubbed at right angles with respect to each other;

FIG. 3 is a schematic illustration showing the manner in which polarized light passes through the liquid crystal unit of the invention;

FIG. 4 illustrates one manner in which an optical image may be produced with the liquid crystal unit of the invention;

FIG. 5 illustrates the manner in which rows and columns of transparent conducting material may be etched on opposing transparent plates which bound a layer of liquid crystal material to effect an array which can be scanned;

Figure 6:
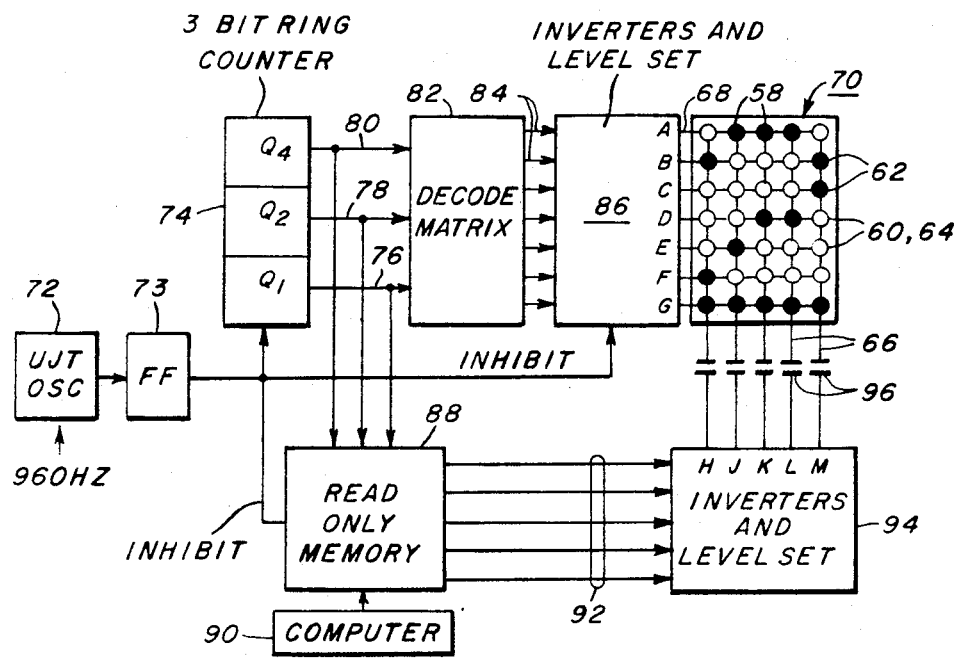
FIG. 6 is a schematic circuit diagram illustrating one manner in which an array, such as that shown in FIG. 5, can be scanned.
Figure 7:
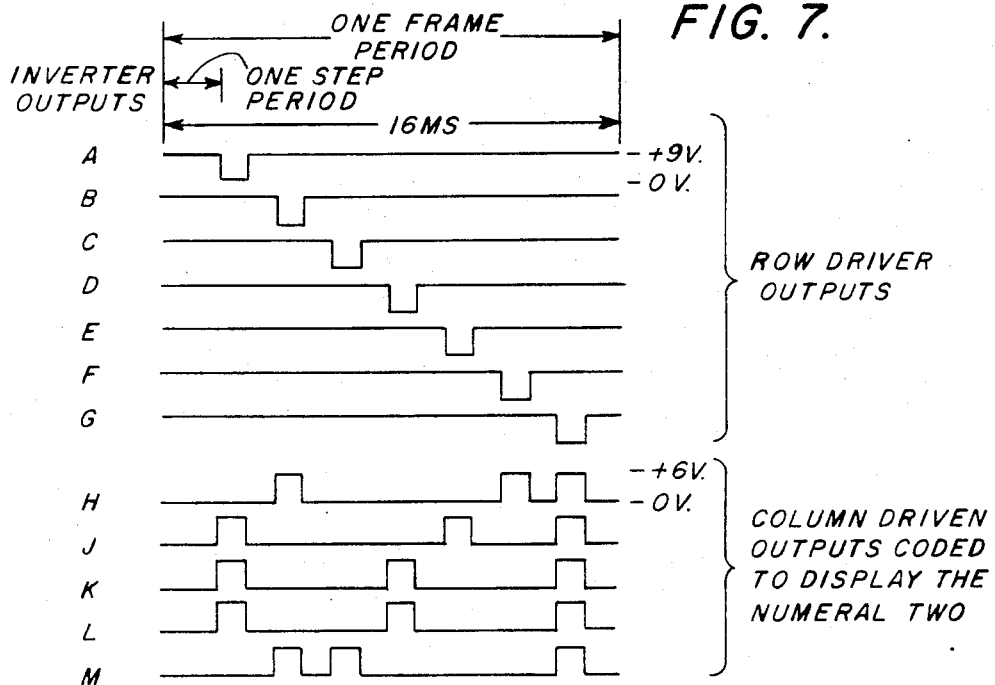

FIG. 7 comprises waveforms illustrating the operation of the circuitry of FIG. 6; and FIG. 8 illustrates still another manner in which conductive films on opposing transparent plates can be etched to provide different optical images.

With reference now to the drawings, and particularly to FIG. 1, there is shown a liquid crystal unit 10 comprising a first transparent plate 12, preferably of glass, and a second transparent plate 14, also of glass, and extending parallel to the plate 12. The plates 12 and 14 are spaced apart by suitable spacers, not shown, by approximately 0.25 to 2 mils; although the spacing may in some instances be as little as 0.1 to 0.05 mil. This space is filled with a nematic-phase liquid crystal material with a positive dielectric anisotropy preferably of the kind hereinabove indicated, namely one comprising major portions such as 20 percent to 80 percent each of bis-(4'-n-octyloxybenzal-2-chlorophenylenediamine and p-methylbenzal-p'-n-butylaniline, these making up about 60 percent to 97 percent of the total composition and p-cyanobenzal-p'-n-butylaniline comprising the remaining 3 percent to 40 percent. This material, as mentioned above, is described in copending application Ser. No. 113,948, filed Feb. 9, 1971.

Disposed on the interior surfaces of the transparent plates 12 and 14 and in contact with the liquid crystal layer 16 are coatings 18 and 20 of thin transparent electroconductive material, such as the known tin oxide or indium oxide coatings. These coatings are quite thin and highly resistive, for example, on the order of 150 ohms per unit square or above, and possibly as high as 5,000 to 10,000 ohms per unit square. It is desirable that the transparent electroconductive coating be of the kind that is applied at relatively low temperatures such as about 500°F, by the process of cathode-sputtering in a vacuum, so that dangers of warpage may be safely avoided.

In FIG. 2, there is shown a view of the plates 12 and 14 which may comprise flat glass on the order of about one-eighth inch thick having layers 18 and 20 of transparent conducting material deposited on the facing surfaces thereof. In the preparation of a liquid crystal unit, the layers of transparent conducting material that are in contact with the nematic-phase liquid crystal material must be prepared by being stroked or rubbed unidirectionally with, for example, a cotton cloth. The direction of rubbing on the respective plates 12 and 14 is indicated by the lines 22 and 24 in FIG. 2; and it will be appreciated that the directions of rubbing on the respective plates are at right angles to each other. The effect of this is to produce a twisted nematic structure as explained above. In this respect, the molecules in a nematic-phase liquid crystal material are each long and straight, and they tend to lie parallel, like logs in a river or straws in a broom. Their parallelism is statistical, rather than perfect and exact. They are free to move with respect to one another, and there are some that are at a small acute angle with respect to the "main stream," and a few others that are at any given moment in a position even less consonant with the bulk of the others. A property of the nematic-phase liquid crystal materials is that the molecules in the vicinity of a rubbed surface tend to align themselves with it. Thus, the molecules nearest the surface of the plate 12, for example, are inclined to orient themselves parallel with the lines 22, nd those nearest the surface of plate 14 are inclined to orient themselves parallel to the lines 24. The structure is fluid and active; and under conditions of no applied voltage, the molecules in the various layers that are parallel to the surfaces of plates 12 and 14 arrange themselves in what may be considered a number of layers of suitable intermediate "mainstream" directions, ranging from one close to parallel to the lines 22 (a short distance from the surface of plate 12) through one at about a 45° angle with respect to both the lines 22 and 24 (at about the midpoint of the distance between the plates 12 and 14); and on to one close to parallel with the lines 24 (a short distance from the surface of plate 14).

The effect of the liquid crystal unit on polarized light directed through the plates 12 and 14 and polarized parallel to the lines 22, for example, is that the unit effects a rotation of the plane of polarization of the light as it passes through the unit, so that the light emanating from the surface of the plate 14 is plane polarized parallel to the lines 24. However, it would not matter if the plane polarized light impinging upon the plate 12, for example, were polarized in parallel planes that were at some angle with respect to the lines 22. The same effect of rotation of the plane of polarization is obtained. The extent of rotation does not need to be 90°. Any desired extent of rotation may be obtained, merely by properly orienting the unidirectionally rubbed surfaces on the plates 12 and 14. However, when the directions of rubbing are at right angles to each other, the extent of rotation is 90°.

The effect of the crystal unit 10 on polarized light is schematically illustrated in FIG. 3. Thus, a source of unpolarized or natural light at 26 impinges upon a conventional polarizer 28 which polarizes the light indicated by the broken lines 30. This polarized light, as it passes through a liquid crystal unit such as unit 10 shown in FIG. 1, will be rotated through 90° so that the polarized light is then polarized in a plane indicated by the broken lines 32. This polarized light will then pass through a second polarizer 34 adapted to pass polarized light in a plane which is rotated at 90° with respect to the plane of polarization of polarizer 28, as indicated by the broken lines 36. Hence, under the conditions described, the polarized light passing through polarizer 28 will be rotated through 90° in unit 10 and will then pass through the polarizer 34. On the other hand, if the polarizer 34 should be rotated such that the plane of polarization indicated by broken lines 36 is parallel to the plane of polarization of polarizer 28, then no light will pass through polarizer 34.

Now, if an electrical potential, on the order of 5 volts or greater, is applied between the conducting films 18 and 20, the liquid crystal unit 10 will no longer rotate the plane of polarization through 90°. In the arrangement shown in FIG. 3, for example, application of a suitable potential to the conducting films 18 and 20 will cause the polarizer 34 to block the transmission of light. It can thus be seen that the device acts as an optical shutter. On the other hand, if the polarizer 34 is oriented 90° with respect to that shown in FIG. 3, no light will be transmitted in the absence of a potential applied between the films 18 and 20; whereas light will be transmitted when a potential is applied thereacross.

Referring again to FIG. 1, the polarizers 28 and 34 are in the form of flat sheets, preferably dichroic polarizing sheets of the type manufactured by Polaroid Corporation. HOwever, other types of polarizers may be used to suit requirements. For that matter, instead of using separate polarizing sheets or separate polarizers, the polarizers can be directly incorporated into the device 10. In this regard, the surfaces of the conductive coatings 18 and 20, for example, can be rubbed and treated with a solution of a dye which forms a dichroic film as described in Dreyer U.S. Pat. Nos. 2,544,659, 2,524,286 and 2,400,877. Such a solution can comprise a 4 percent aqueous solution of methylene blue. By coating the rubbed surface of the conducting film 18 or 20 with this dye solution and allowing it to dry, a dichroic film will be deposited on the surface with a thickness on the order of about 1 micron. By placing the liquid crystal material as described above between the two rubbed plates treated with polarizing material, a single layer material will result which will have the complete system incorporated. Thus, the liquid crystal will align up parallel to the rubbed direction. When these are placed together, the polarizers will be crossed but with the liquid crystals between there will be a maximum of transmission. When an electric field is applied to the conducting layers, the liquid crystal layer will become opaque. This will occur at approximately 5 volts field since the dye represents but a small fraction of the insulating layers between the electrodes.

In FIG. 1, the means for applying an electric field between the conducting films 18 and 20 is shown as a conventional battery 38 adapted to be connected into the conducting films 18 and 20 through switch 40. Alternatively, however, the same effect can be achieved (i.e., changing the plane of the polarized light passing through the device 10) with the use of a magnetic field in which the lines of flux extend perpendicular to the surfaces of the plates 12 and 14 as indicated by the north and south pole indications of FIG. 1. However, as will become apparent hereinafter, the use of a magnetic field in most displays is impractical because of the difficulties in localizing such a field.

With reference now to FIG. 4, one type of optical display which can be provided with the liquid crystal device 10 of FIG. 1 is shown. It again comprises a pair of transparent plates 42 and 44 having their opposing surfaces rubbed in directions at right angles to each other and between which a layer of nematic liquid crystal material of positive dielectric anisotropy is disposed. The resulting sandwich is then placed between polarizers as in FIG. 1, or the facing surfaces of the plates 42 and 44 are treated to form a dichroic film as described above. In this case, however, the conducting films 46 and 48 are in the form of the numeral 4. Assuming that the plates 42 and 44 are assembled with polarizers in the arrangement of FIG. 3 and that switch 52 is closed to apply a potential from battery 50 across the films 46 and 48, the area covered by the films will be opaque while the area around the conducting films 46 and 48 will transmit light. Assuming that a white background is behind the assembled plates 42 and 44 with liquid crystal material and that the plate is viewed from the side opposite the white background, the effect will be to produce the numeral 4 in black-on-white. Of course, when the switch 52 is again opened, the device will be totally light transmitting and no numeral or other optical image will appear to the eye of the observer.

The device of FIG. 4, while workable, can produce only a single optical image such as a numeral or letter within the area encompassed by plates 42 and 44. A system for producing any desired numeral, letter or other image within the same area is shown in FIGS. 5-7. The system again includes two plates 54 and 56 (FIG. 5) having facing surfaces which are rubbed at right angles with respect to each other, the space between the two surfaces being filled with a layer of nematic liquid crystal material of positive dielectric anisotropy. The mating surfaces of the plates 54 and 56 are again coated with a conducting film; but in this case, the plate 54, for example, is etched, utilizing conventional photoresist masking techniques, to provide five vertical columns 58 each having seven enlarged areas 60 spaced along its length. In a somewhat similar manner, the plate 56 is coated and then etched to provide seven horizontal rows 62 each provided with five enlarged area sections 64 of conducting film material between its ends. The plates 54 and 56, when facing each other with a layer of liquid crystal material therebetween, are positioned such that the enlarged area portions 60 on the plate 54 are aligned with or overlie the enlarged area portions 64 on the plate 56. The ends of the strips or columns 58 on the plate 54 are connected to five electrical leads 66. Similarly, the ends of the strips or horizontal rows 62 on plate 56 are connected to a second set of seven electrical leads 68.

The manner in which an assembly formed of the plates of FIG. 5 can be used to produce various images is shown in FIGS. 6 and 7. The assembled device comprising plates 54 and 56 with a layer of nematic liquid crystal material therebetween of positive dielectric anisotropy and suitable cross polarizers is indicated in FIG. 6 by the reference numeral 70. The circles on device 70 represent overlapping enlarged area portions 60 and 64 formed in the columns 58 and rows 62, respectively.

Clock pulses for the display are supplied from an oscillator 72 typically having a frequency of about 960 hertz. These pulses are applied to a flip-flop circuit 73, the output of the flip-flop circuit being fed to a conventional three-bit ring counter 74 which produces pulses on leads 76, 78 and 80, those on lead 76 being divided by two, those on lead 78 being divided by four and those on lead 80 being divided by eight. The pulses on leads 76–80 are applied to a decoding matrix 82 in accordance with well-known techniques to produce pulses on output leads 84 which are displaced in phase with respect to each other. These are applied through inverters 86 and leads 68 to the respective horizontal rows 62 which are identified by the letters A–G.

The outputs of the inverts 86 appearing on leads 68 are identified as waveforms A through G in FIG. 7. During one frame period, a pulse appears on each of the rows in succession. Thus, the pulse in waveform A is applied to the top row first, followed by a pulse applied to the second row, followed by a pulse applied to the third row, and so on. The time required for pulses in waveforms A–G to be applied in succession to each of the rows is referred to as one frame period and may typically be 16 microseconds; however the frame period may be any desired time interval, depending upon the size of the display and the number of horizontal rows employed. Note that the pulses in waveforms A–G are of negative polarity. These pulses are applied to the rows in succession continuously regardless of the optical image, such as a numeral or letter, which it is desired to produce.

The pulses on leads 76–80 are also applied to a read-only memory unit 88 connected, for example, to computer circuitry 90 or the like. The pulses on leads 76–80 activate the read-only memory unit 88 to apply to leads 92 a succession of pulses representative of a particular numeral, letter or other image to be displayed. These are applied through inverters 94 and capacitors 96 to the vertical rows 58 which are identified by the letters H–M. It will be assumed that the background behind the unit 70 is white and that the liquid crystal sandwich including polarizers on opposite sides of the liquid crystal layer normally transmits polarized light in the absence of the application of an electrical potential applied across the liquid crystal layer. That is, the arrangement of FIG. 3 is employed. In order to produce the numeral 2, for example, only those areas colored black in FIG. 6 between the strips 58 and 62 should have electrical potentials applied therebetween, whereby these areas will be opaque and appear black when viewed by an observer. In order to accomplish this effect, the waveforms H–M of FIG. 7 are applied to the leads 66. Note that in order to produce the numeral 2, the second, sixth and seventh areas 60, 64 between the strips 58 and 62 in column H must have potentials applied thereacross. Consequently, the waveform H comprises a first positive pulse in the frame period coinciding with the negative pulse in waveform B, a second positive pulse coinciding with the negative pulse in waveform F, and a third positive pulse coinciding with the negative pulse in waveform G. As the pulses on leads 68 sweep through one frame period, those which coincide with positive pulses in waveform H will cause the second, sixth and seventh areas to become opaque. Similarly, in column J, it is necessary to render the first, fifth and seventh areas opaque. This is caused by having a positive pulse in waveform J coincide with a negative pulse in waveform A, a positive pulse in waveform J to coincide with a negative pulse in waveform E and a positive pulse in waveform J to coincide with a negative pulse in waveform G. The various areas forming the numeral 2 of FIG. 7 will not be continually opaque; however the sweeping action will occur sufficiently rapidly so that a continual image will appear to the naked eye. Any flicker effect appearing to the observer can be reduced by shortening the frame period and increasing the scanning frequency.

In FIG. 8, still another embodiment of the invention is shown wherein one of two transparent plates 96 is provided with a continuous layer of transparent conducting material 98; while the other transparent plate 99 is provided with a series of mutually insulated strips of transparent conducting material 100. The total configuration, when opaque, represents the numeral 8. Beneath the configuration 100 is a line or bar 102 and to the right of the configuration is a dot 104 which forms a decimal point when a plurality of the arrays of FIG. 8 are placed side-by-side. The dot 104 is aligned with area 98A of layer 98; while area 98B is aligned with the bar 102. The various mutually insulated conductive strips forming the configuration 100, in turn, are connected through a plurality of mutually insulated strips of transparent conducting material 106 to external leads, not shown. Assuming, for example, that it is desired to form the numeral 3, the plate 98 on one side of the layer of liquid crystal material will be connected to a source of positive potential while the transparent strips on the other side forming a 3 will be connected through leads 108 to a source of negative potential. If it is desired to place a decimal point beside the numeral, the lead connected to the spot 104 will be connected to the same source of negative potential; and if it is desired to provide a line beneath the numeral, the lead connected to strip 102 will be connected to the source of negative potential. In any case, only those portions on the plate 99 will appear opaque on a white background (or vice versa) which are connected to a source of potential of polarity opposite to that applied to the plate 98. As will be appreciated, a series of the displays shown in FIG. 8 can be assembled in side-by-side relationship to provide any desired number of digits.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A device for converting electrical intelligence into an optical image comprising a layer of liquid crystal material nematic at room temperature and disposed between transparent parallel plates, both of said plates being coated with films of transparent conducting material, at least one of said plates being coated on only selected areas thereof with films of transparent conducting material, means for effecting a twisted nematic structure in said layer of liquid crystal material, polarizers on opposite sides of said layer of liquid crystal material and extending essentially parallel to said plates to provide a sandwich structure through which light can pass, and means for establishing a potential difference between films on the respective plates such that some areas of the sandwich structure will transmit light while others will not to thereby form an optical image.

2. The device of claim 1 wherein said liquid crystal material comprises a mixture of 40 percent bis-(4'-n-octyloxybenzal)-2-chlorophenylenediamine, 50 percent p1methylbenzal-p'-n-butylaniline and 10 percent p-cyanobenzal-p'-n-butylaniline.

3. The device of claim 1 wherein said polarizers comprise polarizing sheets on the sides of said plates opposite said liquid crystal material.

4. The device of claim 1 wherein the crystal material is nematic and of positive dielectric anisotropy.

5. The device of claim 1 wherein one of said polarizers polarizes light at right angles to the other, whereby light will pass through the entirety of said sandwich structure with no electrical potential established between said films, said films acting to block the passage of light through selected areas of said sandwich structure upon application of a potential difference between said films.

6. The device of claim 1 wherein said films on the respective plates are in the form of a desired image.

7. The device of claim 1 wherein said films on the respective plates are in the form of mutually insulated strips which cross each other.

8. The device of claim 9 including means for applying pulses to the mutually insulated strips on the respective plates.

9. The device of claim 10 including means for applying pulses of one polarity in succession to the strips on one of said plates, and means for simultaneously and selectively applying pulses of the opposite polarity to the strips on the other of said plates, each of said pulses of the opposite polarity being in phase with at least one of the pulses of said one polarity, whereby light transmitting characteristics of said sandwich structure will be varied at selected crossings of the strips on the respective plates to form an optical image.

10. The device of claim 11 wherein said pulses of one polarity and said pulses of the opposite polarity occur during a frame period, and including means for continually repeating said frame period.

11. The device of claim 1 wherein one of said plates is coated with mutually insulated film portions of transparent conducting material arranged to form any one of a plurality of images, the other of said plates being coated with an unbroken area of conducting material which covers the entire area of the portions on the opposite plate, and means for selectively establishing a potential between the film on said other plate and selected ones of said portions on said one plate.

* * * * *